W. T. CUSHING.
METHOD OF MOLDING COMPOSITE MATERIALS.
APPLICATION FILED SEPT. 23, 1915.
1,358,297. Patented Nov. 9, 1920.
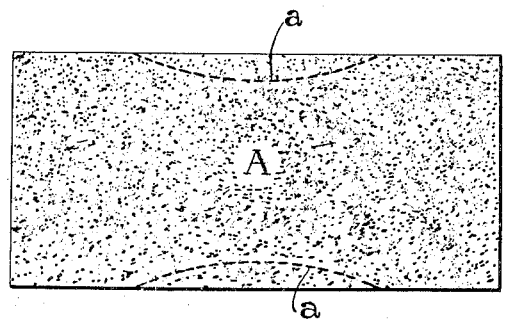
Inventor
William T. Cushing
By Frank H. Hubbard
Attorney

UNITED STATES PATENT OFFICE.

WILLIAM T. CUSHING, OF MILWAUKEE, WISCONSIN, ASSIGNOR TO THE CUTLER-HAMMER MFG. CO., OF MILWAUKEE, WISCONSIN, A CORPORATION OF WISCONSIN.

METHOD OF MOLDING COMPOSITE MATERIALS.

1,358,297.   Specification of Letters Patent.   Patented Nov. 9, 1920.

Application filed September 23, 1915. Serial No. 52,194.

*To all whom it may concern:*

Be it known that I, WILLIAM T. CUSHING, a citizen of the United States, residing at Milwaukee, in the county of Milwaukee and State of Wisconsin, have invented new and useful Improvements in Methods of Molding Composite Materials, of which the following is a full, clear, concise, and exact description, reference being had to the accompanying drawing, forming a part of this specification.

This invention relates to an improved method of cold molding composite materials and is particularly advantageous in the manufacture of electrical insulating pieces comprising fibrous bases and organic binders.

In the manufacture of such insulating pieces it has been found that the same when cold molded vary widely in mechanical strength according to their shapes. For example, it has been found that a cup-shaped piece of a given material when cold molded under a given pressure per unit of area possesses considerably greater mechanical strength than a flat slab of the same material even when molded under precisely the same pressure per unit area. This lack of uniformity or uncertainty in mechanical strength is an extremely undesirable factor in the manufacture of commercial products, whereas the utility of those pieces lacking in strength is greatly curtailed.

It is an object of this invention to provide a method of molding which will increase the mechanical strength of those products heretofore handicapped by their shape, and which will tend toward the desired uniformity.

This method is based upon the theory that the shape of the product affects its mechanical strength by determination of the extent to which the material flows in the molding. In other words, it is assumed that the strength of the molded piece increases with a limited increased flow of the material in molding and that those pieces which show a lack of mechanical strength are of such shape as to minimize the flow of material during molding. Just why the flow of material strengthens the products has not been definitely ascertained but it probable that it produces a weld of the particles thereof through a rubbing action of one over the other as distinguished from the mere intimate contact effected by pressure alone. Upon this theory it is now proposed to form pieces heretofore found lacking in strength by first molding the same under the usual pressure to affect intimate contact of the particles of material employed, regardless of whether or not a flow of material is effected, and then remolding to effect a substantial flow of the material.

In further explanation of the invention the method exemplified by the accompanying drawing will now be described.

Referring to the drawing, it will be assumed that it is desired to mold a given material into the form of a flat slab A as shown in full lines. To this end the material is initially molded under pressure into the desired form, then cut away on its margins as illustrated in dotted lines, the severed portions *a* being removed and then the slab remolded under pressure to its original form. Here it should be noted that the incisions in the mass are of such a character that the material may be repressed into its original shape without necessitating the healing of any cuts therein. In other words, the incisions are so made as not to separate any particles which must be subsequently united and this is an important feature of the method. If this precaution is not taken there is always the probability of a line of weakness in the finished product.

As above stated, it is believed that the flow of the material effects a welding of the particles not affected by mere contact thereof under pressure but whether or not this be true, the method nevertheless effects a material increase in the mechanical strength of the product. For example, it has been found that a material comprising an asbestos base and a bakelite "A" binder when cold molded at a single operation into a slab approximately 3 by ¾ inches and ¼ inch thick will, when supported at its ends, break on a cross strain of 40 pounds whereas the same material molded and remolded as described will withstand approximately 90 pounds strain under the same conditions. Again, a slab of commercial Thermoplax of the same dimensions has been found to break under a strain of 50 pounds when molded in the usual way at a single operation, whereas when molded as above set forth, it will withstand approximately 80 pounds cross breaking strain.

It is, of course, to be understood that where a portion of the mass is removed as described for the remolding operation the initial mass must be augmented in thickness to compensate in the finished product for the material removed. Also, it is to be understood that the invention contemplates removal of the material at any desired points for remolding and further contemplates accomplishment of the desired flow in other ways. For example, the results above described might be accomplished by initially molding the material into one shape and then into another or initially into the same shape as the final product but with a difference in dimensions.

What I claim as new and desire to secure by Letters Patent is:

1. The method of cold molding composite materials in forms tending to minimize the mechanical strength thereof consisting in molding and remolding such materials under unidirectional pressure and under conditions insuring intimate contact of the particles thereof by the initial molding operation and a flow of the molded mass by the remolding operation.

2. The method of cold molding composite materials, comprising fibrous bases and organic binders where the form of the product tends to minimize the mechanical strength of the material employed, consisting in molding the material under pressure applied to certain of its surfaces to effect an intimate contact of its particles and then remolding the mass thus obtained under pressure applied to the same of said surfaces and under conditions insuring a flow thereof into final form without necessity for internal healing of edges.

3. The method of cold molding composite materials in forms tending to minimize the mechanical strength thereof consisting in molding a portion of said material in excess of that required in the finished product, subsequently reducing the bulk of molded material by the amount so in excess while varying the form thereof in such manner as to avoid the necessity of internal healing of edges during subsequent molding, and thereafter remolding the residuum of said material to the desired form.

4. The method of cold molding composite materials in forms inherently tending to reduce the mechanical strength of the product, consisting in initially molding under pressure and substantially to the desired final form, a portion of material in excess of that required in the finished product, subsequently reducing the bulk of molded material by the amount so in excess while varying the form thereof in such manner as to avoid the necessity of internal healing of edges during subsequent molding and thereafter remolding the residium of said material to the desired form.

5. The method of cold molding composite materials in forms inherently tending to reduce the mechanical strength of the product, consisting in initially molding the material to substantially the desired final form under pressure applied to certain of its surfaces to effect an intimate contact of its particles, thereafter varying the form of the mass thus obtained in such manner as to avoid the necessity of internal healing of edges during a subsequent step, and thereafter remolding the material under pressure applied to the same of said surfaces for insuring a flow of its particles and a more intimate contact and cohesion therebetween.

In witness whereof, I have hereunto subscribed my name in the presence of two witnesses.

WILLIAM T. CUSHING.

Witnesses:
 HENRY F. VOGT,
 OSCAR A. KELLER.